United States Patent [19]
Van Vleet

[11] Patent Number: 5,908,201
[45] Date of Patent: Jun. 1, 1999

[54] TRAILER HITCH

[76] Inventor: Robert D. Van Vleet, 405 12th St., Sidney, Nebr. 69162

[21] Appl. No.: 08/909,132

[22] Filed: Aug. 11, 1997

Related U.S. Application Data

[63] Continuation of application No. 08/564,818, Nov. 29, 1995.
[51] Int. Cl.$^6$ ........................................................ B60D 1/07
[52] U.S. Cl. ........................ 280/416.1; 280/511; 280/504
[58] Field of Search .............................. 280/415.1, 416.1, 280/504, 511, 512, 514, 515, 507

[56] References Cited

U.S. PATENT DOCUMENTS

| | | | |
|---|---|---|---|
| 2,431,694 | 12/1947 | Johnson | 280/504 |
| 3,479,057 | 11/1969 | Miller | 280/511 |
| 3,730,558 | 5/1973 | Litzenberger | 280/511 |
| 3,865,407 | 2/1975 | Klassen | 280/515 |
| 3,963,266 | 6/1976 | Thelin | 280/504 |
| 4,434,996 | 3/1984 | Wallace | 280/504 |
| 4,522,421 | 6/1985 | Vance | 280/511 |
| 4,568,098 | 2/1986 | Landry, Jr. | 280/416.1 |
| 4,596,406 | 6/1986 | Van Vleet et al. | 280/416.1 X |
| 4,607,858 | 8/1986 | Wagner | 280/491.5 |
| 4,772,039 | 9/1988 | Cook | 280/416.1 |
| 4,844,498 | 7/1989 | Kerins et al. | 280/504 |
| 5,085,452 | 2/1992 | Janeiro | 280/511 |
| 5,106,114 | 4/1992 | Haupt | 280/416.1 |
| 5,290,057 | 3/1994 | Pellerito | 280/511 X |
| 5,312,128 | 5/1994 | Blacklaw | 280/512 |
| 5,419,576 | 5/1995 | Van Vleet | 280/511 X |

Primary Examiner—Kevin Hurley
Attorney, Agent, or Firm—Merchant, Gould, Smith, Edell, Welter & Schmidt, P.A.

[57] ABSTRACT

A trailer hitch including a base that is adapted for connection to a vehicle. A sleeve having a shaft mounted therein is preferably connected to the base. A mounting shank is preferably connected to the base at a location that is offset from the sleeve. A spool is removably mountable on the mounting shank. The trailer hitch also includes a pivotal locking arm that extends transversely outward from the shaft. A reinforcing member is connected to the pivotal locking arm at a location offset from the sleeve. The reinforcing member extends downward from the pivotal locking arm and is arranged such that the reinforcing member can engage the spool to increase the pull strength of the trailer hitch.

31 Claims, 8 Drawing Sheets

TRAILER HITCH

This is a File Wrapper Continuation of application Ser. No. 08/564,818, filed Nov. 29, 1995.

FIELD OF THE INVENTION

The present invention relates generally to coupling structures. Specifically, the present invention relates to trailer hitches.

BACKGROUND OF THE INVENTION

Trailer hitches are manufactured in a variety of sizes and configurations. One common type of trailer hitch is a ball hitch which is used in combination with a ball coupler of a trailer. In the United States and Canada, hitch balls do not have one standard size. For example, common hitch ball sizes include 1⅞ inches, 2 inches and 2 5/16 inches. Hitch ball size variance is a problem because vehicles equipped with a single hitch ball cannot pull trailers having couplers sized to mate with hitch balls of different sizes.

Another common type of trailer hitch is a pintle hitch. Pintle hitches are typically generally hook shaped and are designed to be coupled with a lunette ring of a trailer. Pintle hitches are rated for higher pulling strengths than ball hitches and are therefore used to pull larger loads.

A problem exists in that there are few hitch systems available that can be converted between 1⅞ inch hitch balls, 2 inch hitch balls, 2 5/16 inch hitch balls and pintle hitches. Existing devices that are convertible between hitch balls and pintle hitches are large, expensive to manufacture and unattractive.

SUMMARY OF THE INVENTION

The present invention relates to a compact, durable and easy-to-operate trailer hitch that is convertible between a large towing load capacity pintle hitch and various sized hitch balls. The trailer hitch preferably includes a base that is adapted for connection to a vehicle. A mounting shank adapted for individually and removably mounting a pintle hitch spool and a plurality of varying size hitch balls is connected to the base. The trailer hitch also includes a locking arm preferably for use in combination with the pintle hitch spool to securely couple a lunette ring of a trailer to the trailer hitch. The locking arm is preferably movable between first and second positions. In the first position, the locking arm is offset from the mounting shank. In the second position, the locking arm is aligned above and directly adjacent to the mounting shank.

When used as a pintle hitch, the locking arm is first moved to the first position. Then, the spool is mounted on the mounting shank and the lunette ring of the trailer is inserted over the spool. Next, the locking arm is moved to the second position such that the locking arm is in shear transferring engagement with the top of the spool. While in the second position, the locking arm prevents the lunette ring from disengaging from the spool. Additionally, the locking arm and the mounting shank together support the top and bottom of the spool. Such double engagement of the spool causes towing loads that are applied to the spool by the lunette ring to be transferred through both the locking arm and the mounting shank thereby increasing the shear capacity of the hitch.

For use as a ball hitch, the pintle hitch spool is preferably replaced with a hitch ball of the appropriate size. When the trailer hitch is used as a ball hitch, it is preferred for the locking arm to be left in the first position to provide clearance for the ball coupler of the trailer.

It will be appreciated that the trailer hitch can also include a locking structure such as one or more locking pins, or a plunger assembly for locking the pivotal locking arm in the first and second positions.

A variety of additional advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. A brief description of the drawings is as follows.

DETAILED DESCRIPTION OF THE INVENTION

Reference will now be made in detail to exemplary embodiments of the present invention which are illustrated in the accompanying drawings. Wherever possible, the same reference numbers will be used throughout the drawings to refer to the same or like parts.

Figure 1:
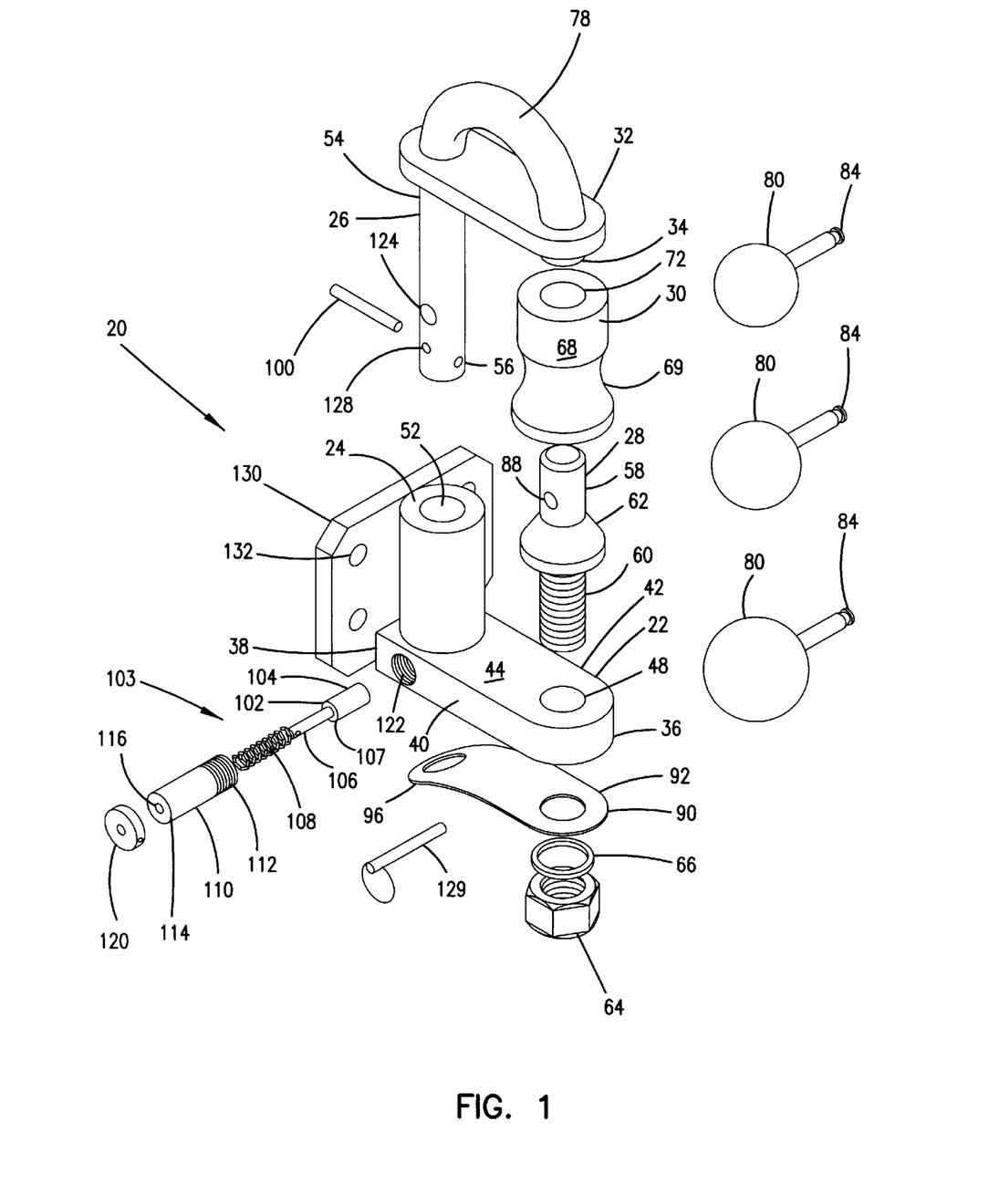
FIG. 1 is a perspective view of a trailer hitch constructed in accordance with the principles of the present invention.

FIG. 1 shows a trailer hitch 20 including a base 22 that is adapted for connection to a vehicle. A mounting shank 28 adapted to individually and removably mount a pintle hitch spool 30 and a plurality of hitch balls 80, is preferably connected to the base 22. A sleeve 24 is mounted on the base 22 at a location offset from the mounting shank 28. Telescopically and rotatedly mounted within the sleeve 24 is a shaft 26. Connected to an upper portion of the shaft 26 is a pivotal locking arm 32 that extends radially outward from the shaft 26. The pivotal locking arm 32 includes a reinforcing member 34 that is spaced a predetermined distance from the sleeve 24 and is configured to fit within the top of the spool 30. When the reinforcing member 34 is inserted in the top of the spool 30, the locking arm 32 prevents the spool from disengaging from the mounting shank 28 and the reinforcing member 34 is in shear transferring engagement with the top of the spool 30.

The term "shear transferring engagement" means that towing forces applied to the spool 30 in a direction generally perpendicular to the longitudinal axis of the mounting shank 28 are transferred through the spool 30 to the pivotal locking arm 32. In this manner, both the mounting shank 28 and the pivotal locking arm 32 bear the towing loads which are applied to the spool 30. Further details of the component parts and the operation of the trailer hitch 20 are described in the following paragraphs.

The base 22 of the trailer hitch 20 preferably is a steel plate having a curved distal end 36 that opposes a generally flat proximal end 38. Extending between the distal end 36 and the proximal end 38 are opposing left and right side walls 40 and 42. The base 22 also preferably includes a top side 44 opposite a bottom side 46. A first opening 48 is defined by the base 22 adjacent to the distal end 36. The first opening 48 extends generally perpendicularly between the top side 44 and bottom side 46 of the base 22 and is generally concentrically aligned with the curved distal end 36 of the base 22. Near the proximal end 38 of the base 22, a second opening 50 extends generally perpendicular between the top and bottom sides 44 and 46 of the base 22.

The mounting shank 28 of the trailer hitch 20 preferably has an upper portion 58 that is preferably cylindrical and that has a smooth outer surface. The mounting shank 28 also has a lower portion 60 that has a threaded outer surface. A flared pedestal 62 is preferably located between the upper portion 58 and the lower portion 60 of the mounting shank 28. The flared pedestal 62 circumferentially surrounds the mounting shank 28 and flares circumferentially outward in a direction toward the lower portion 60 of the mounting shank 28.

The mounting shank 28 is connected to the base 22 by inserting the threaded lower portion 60 of the mounting shank 28 through the first opening 48 in the base 22. As inserted in the first opening 48 of the base 22, the flared pedestal 62 of the mounting shank 28 engages the top side 44 of the base 22 while the threaded lower portion 60 of the shank 28 extends below the bottom side 46 of the base 22. The mounting shank 28 is preferably secured to the base 22 by a nut 64 that is threaded on the lower portion 60 of the mounting shank 28. A spring washer 66 is preferably mounted between the nut 64 and the bottom side 46 of the base 22 to prevent the nut 64 from loosening.

The spool 30 of the trailer hitch 20 is generally cylindrical shaped and includes an outer surface 68 for engaging a lunette ring of a trailer and inner surface 70 defining a central opening 72. Adjacent the top of the spool 30 the outer surface 68 is generally cylindrical. Adjacent the bottom of the spool 30, the outer surface 68 is curved to define a recess 69 that extends around the perimeter of the spool for receiving a lunette ring.

The central opening 72 is configured to mate with the mounting shank 28. For example, adjacent the top of the spool 30, the central opening 72 is generally cylindrical and sized to fit over the upper portion 58 of the mounting shank 28. Adjacent the bottom of the spool 30, the central opening 72 flares outward to match the contour of the flared pedestal 62 of the mounting shank 28. It will be appreciated that when the spool 30 is mounted on the mounting shank 28, the top of the mounting shank 28 is offset slightly below the top of the spool 30 to provide space for receiving the reinforcing member 34.

The sleeve 24 of the trailer hitch 20 is preferably welded to the base 22 at a location adjacent to the proximal end 38 of the base 22. The sleeve 24 preferably defines a longitudinal opening 52 that is preferably co-axially aligned with the second opening 50 of the base 22. The sleeve 24 is preferably cylindrical and preferably extends perpendicularly outward from the top side 44 of the base 22.

The shaft 26 of the trailer hitch 20 is preferably a steel cylindrical rod that extends through the longitudinal opening 52 of the sleeve 24 and the second opening 50 of the base plate 22. The shaft 26 has an upper portion 54, a lower portion 56 and a longitudinal axis extending therethrough. The shaft 26 is preferably rotatable within the sleeve 24 about the longitudinal axis. As mounted in the sleeve 24, the upper portion 54 of the shaft 26 preferably extends above the top of the sleeve 24 and the lower portion 56 of the shaft 26 extends below the bottom side 46 of the base 22. It is preferred for the shaft 26 to have a limited range of telescopic or longitudinal upward and downward movement with respect to the sleeve 24.

The pivotal locking arm 32 of the trailer hitch 20 is preferably welded to the upper portion 54 of the shaft 26 and extends generally transversely outward from the shaft 26. The reinforcing member 34 extends generally downward from the bottom side of the pivotal locking arm 32 at a location distally offset from the shaft 26. The reinforcing member 34 is generally cylindrical, and is sized to fit within the central opening 72 defined by the top of the spool 30. A curved handle 78 preferably extends across the top of the pivotal locking arm 32 to facilitate manually moving the pivotal locking arm 32.

It is preferred for the shaft 26, the handle 78 and the reinforcing member 34 to be constructed as a one-piece unit. A first end of the handle 78 is preferably integrally formed with the upper portion 54 of the shaft 26. A second end of the handle 78 forms the reinforcing member 34 of the hitch 20. The handle 78 is curved approximately 180 degrees such that both ends of the handle 78 are oriented generally downward. The upper portion 54 of the shaft 26 and the reinforcing member 34 preferably extend through openings defined by the pivotal locking member 32. The locking member 32 is preferably welded to the handle 78 and preferably extends across the curvature of the handle 78.

Figure 2:
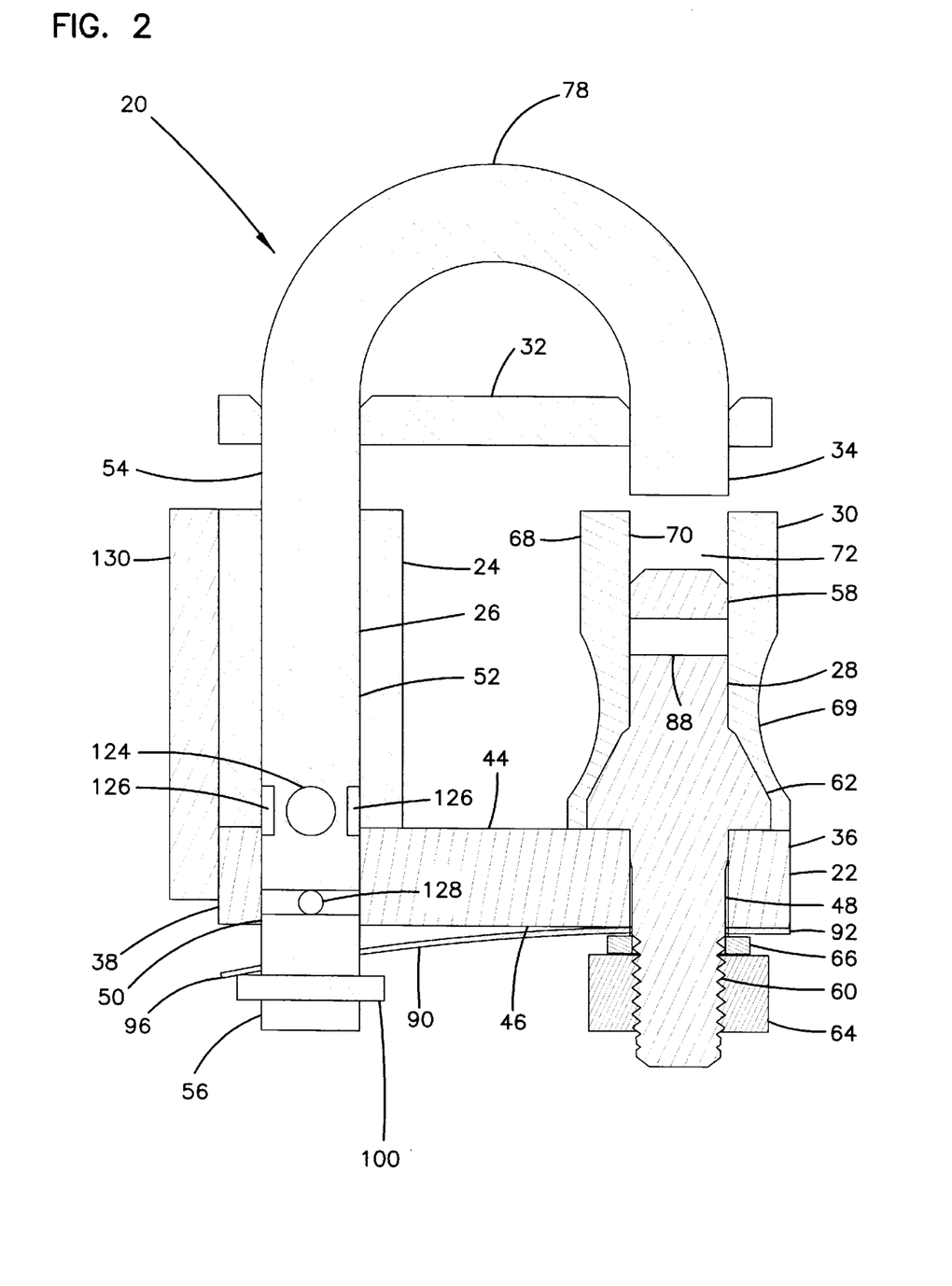
FIG. 2 is a cross-sectional view of the trailer hitch of FIG. 1 with the pivotal locking arm in an upper position.
Figure 3:
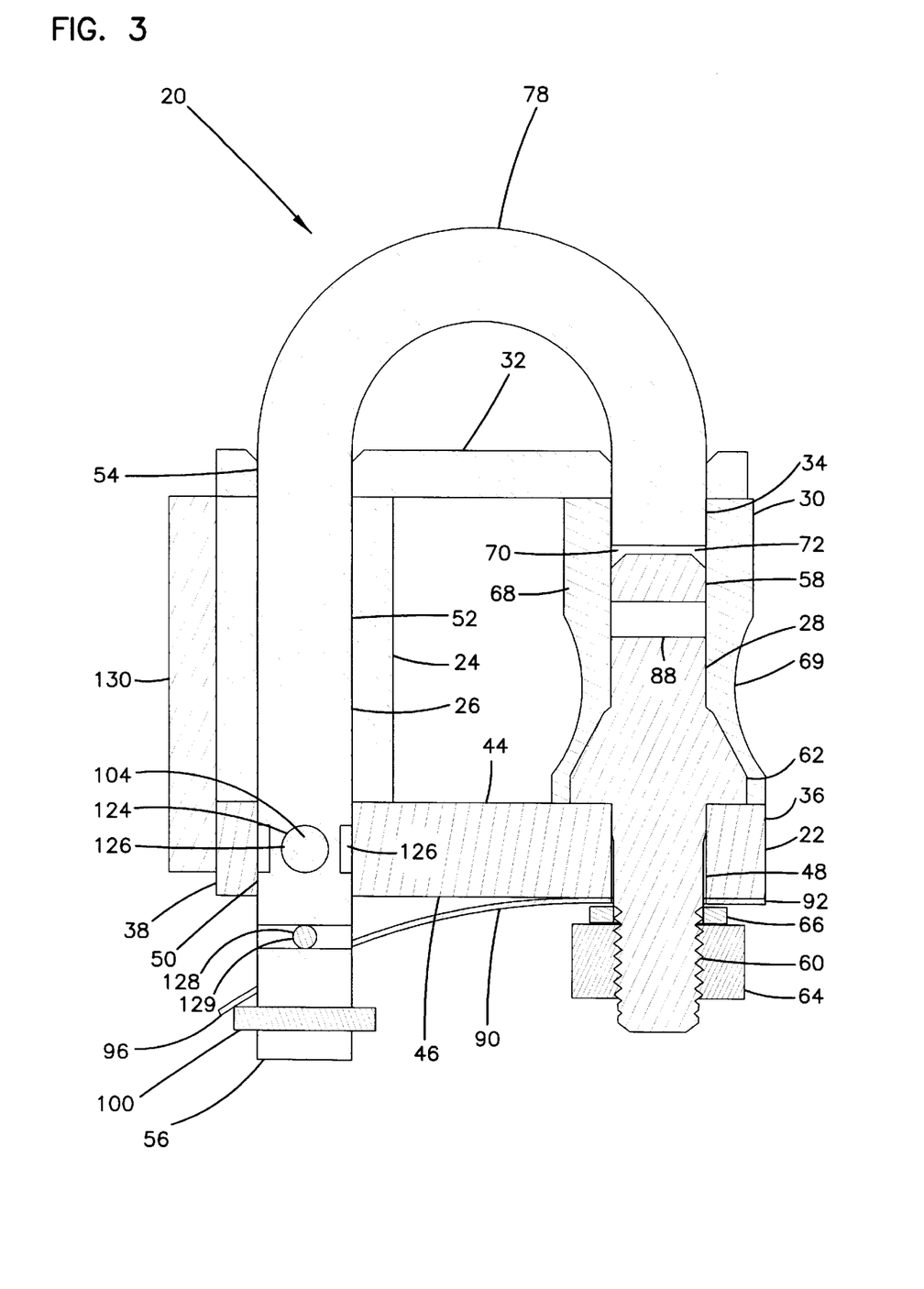
FIG. 3 is a cross-sectional view of the trailer hitch of FIG. 1 with the pivotal locking arm in a lower position.

Because the shaft 26 is telescopically mounted in the sleeve 24, the pivotal locking arm 34 can be manually moved vertically upward and downward relative to the base 22. For example, FIG. 2 shows the pivotal locking arm 34 in an upper position. In the upper position, the pivotal locking arm 34 is vertically offset from the top of the sleeve 24. FIG. 3 shows the pivotal locking arm in a lower position. In the lower position, the pivotal locking arm 24 is preferably seated on the top of the sleeve 24 and engages the top of the spool 30.

Figure 4:
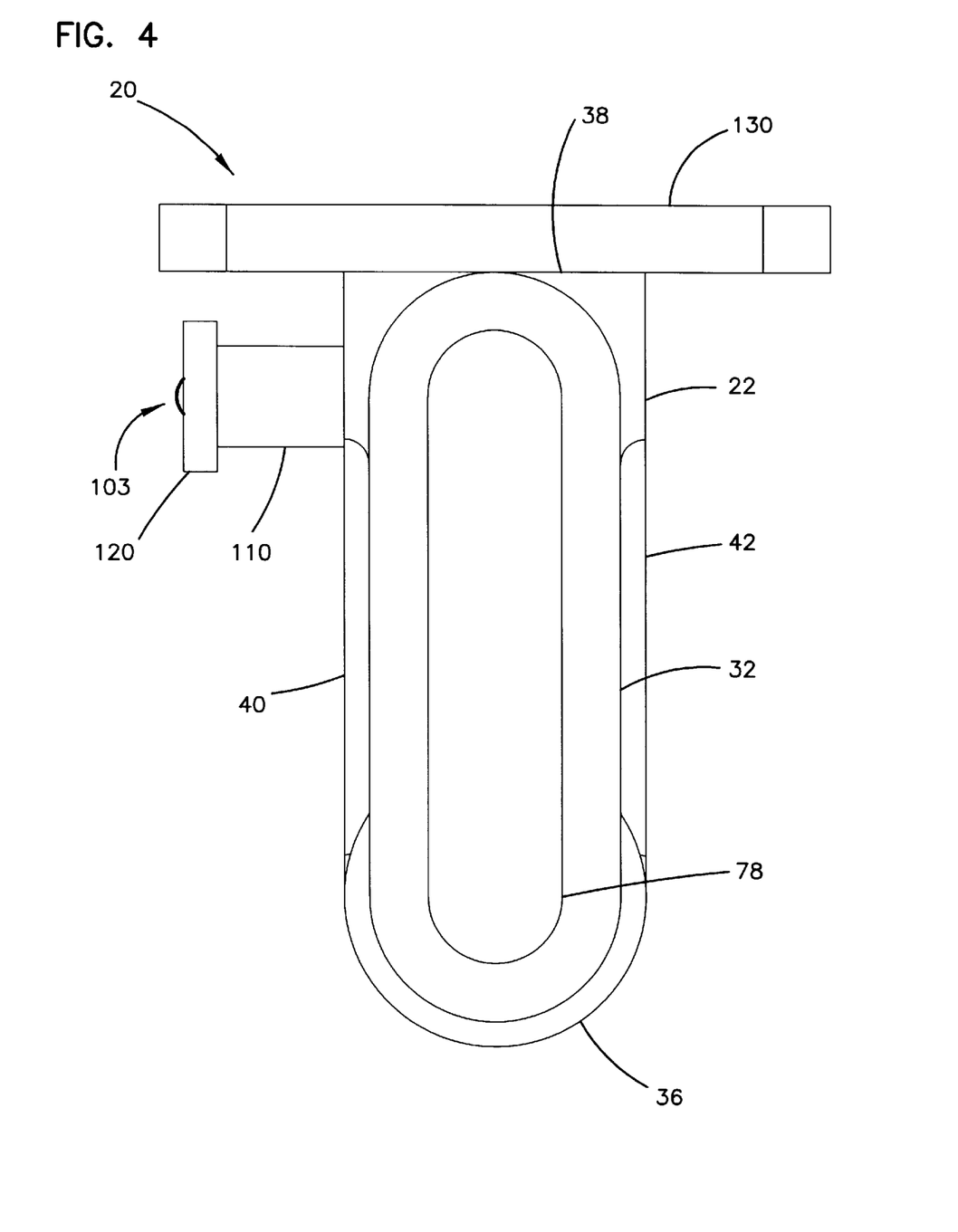
FIG. 4 is a top view of the trailer hitch of FIG. 1 with the pivotal locking arm in a closed position.
Figure 5:
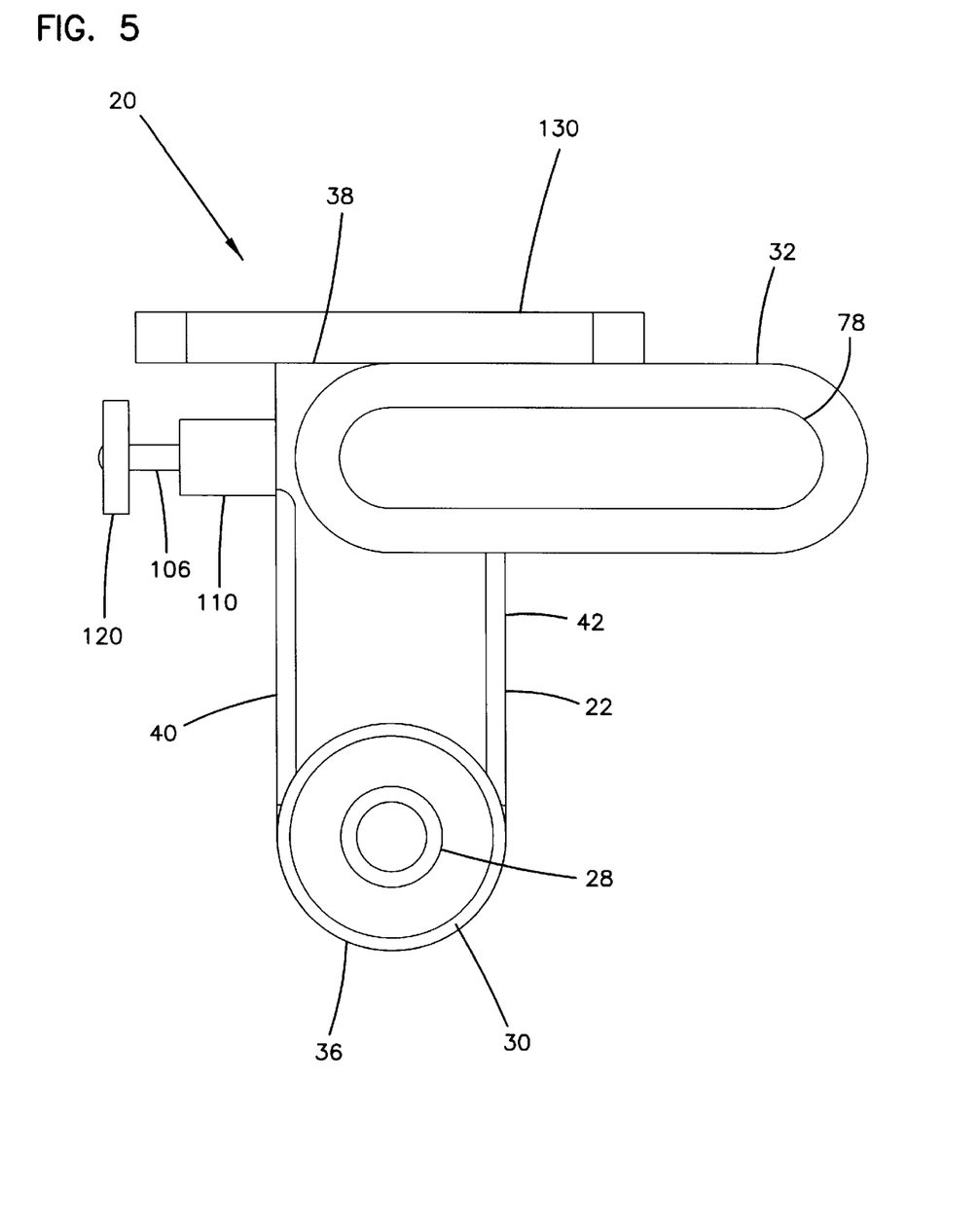
FIG. 5 is a top view of the trailer hitch of FIG. 1 with the pivotal locking arm in an open position.

Because the shaft 26 is rotatably mounted in the sleeve 24, the pivotal locking arm 32 is rotatable about the longitudinal axis of the shaft 26. For example, the pivotal locking arm 32 can be manually moved between a closed position (as shown in FIG. 4) and an open position (as shown in FIG. 5). When the pivotal locking arm 32 is in the closed position, the reinforcing member 34 is aligned directly above the top of the mounting shank 28. When the pivotal locking arm 32 is in the open position, the pivotal locking arm 32 is pivoted approximately 90 degrees from the closed position and is generally transversely aligned with respect to the base 22.

The trailer hitch 20 also preferably includes a plurality of hitch balls 80 that are removably mountable on the mounting shank 28. It will be appreciated that the hitch balls 80 may have a variety of sizes. For example, standard hitch ball diameters are 1⅞ inches, 2 inches and 2 5/16 inches.

Each of the hitch balls 80 preferably defines a central opening 82 configured to receive the mounting shank 28. Therefore, the central openings 82 generally conform to the outer shape of the mounting shank 28.

Figure 6:
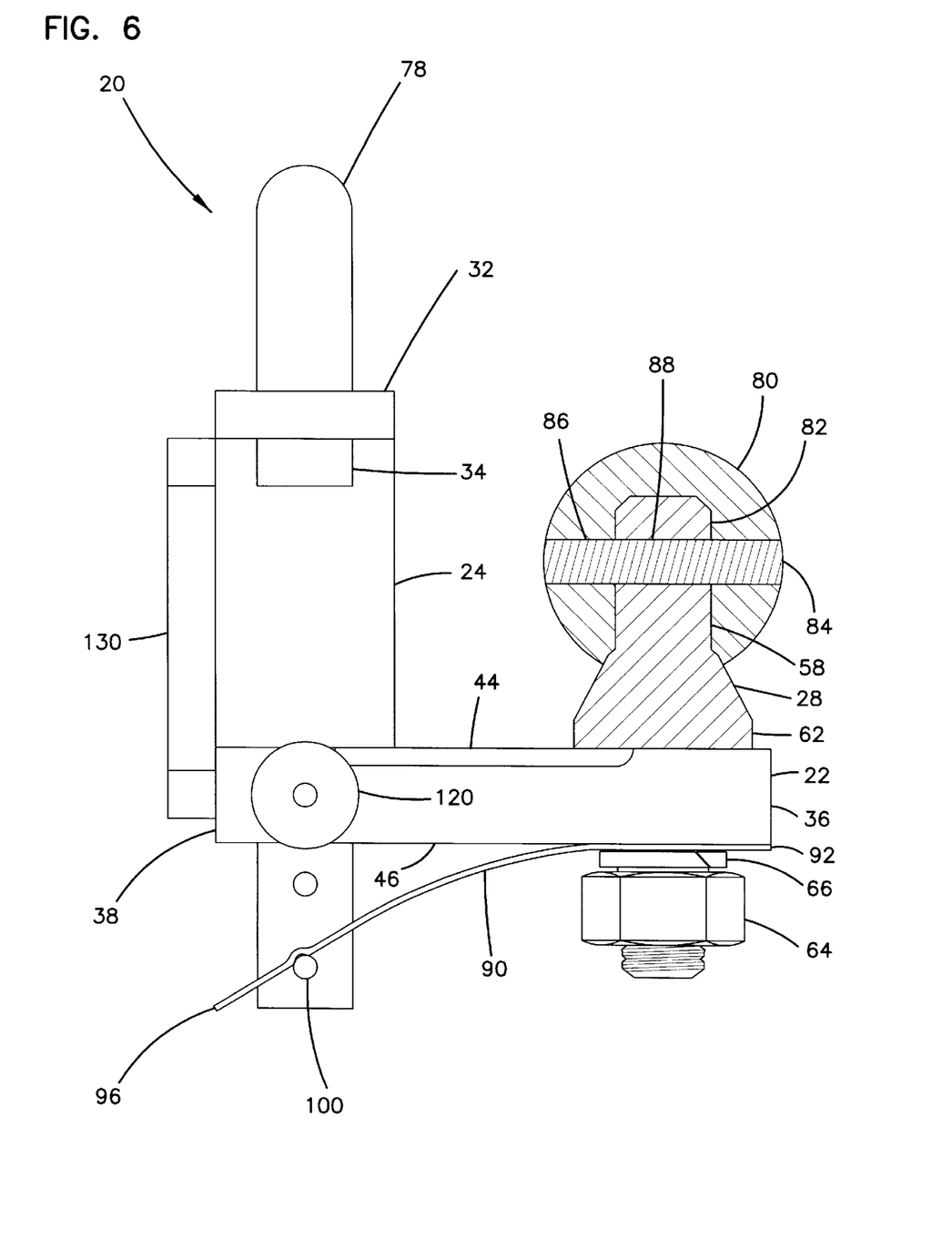
FIG. 6 is a cross-sectional view of the trailer hitch of FIG. 1 with a hitch ball mounted on the mounting shank.

The hitch balls 80 preferably include pins 84 for locking the balls 80 on the mounting shank 28. The pins 84 are slidingly mounted within first pin openings 86 defined by the hitch balls 80. The first pin openings 86 are aligned generally transversely with respect to the central opening 82 of the hitch ball 80. The upper portion 58 of the mounting shank 28 preferably defines a second pin opening 88 extending transversely therethrough for receiving the pins 84 of the hitch balls 80 when the hitch balls 80 are mounted on the mounting shank 28 (as shown in FIG. 6).

The trailer hitch 20 also preferably includes a spring member such as a leaf spring 90 that is mounted along the bottom side 46 of the base 22. The leaf spring 90 biases the shaft 26 in a downward direction. The leaf spring 90 also prevents the shaft 26 from being upwardly removed from the sleeve 24.

The leaf spring 90 includes a first end 92 that is mounted on the threaded lower portion 60 of the mounting shank 28 and preferably secured between the spring washer 66 and the bottom side 46 of the base 22. The leaf spring 90 also includes a second end 96 that is bent away from the bottom side 46 of the base 22 and that is mounted on the lower portion 56 of the shaft 26. A cotter pin 100 is inserted through an opening defined by the shaft 26 to prevent the second end 96 of the leaf spring 90 from disengaging from the shaft 26.

It is preferred for the trailer hitch 20 to include one or more locking structures for selectively restricting the pivotal and upward and downward movement of the pivotal locking arm 32. For example, one locking structure is a plunger assembly 103 that includes a plunger 102 having a head portion 104 and a pin portion 106. The head portion 104 has an enlarged diameter as compared to the pin portion 106. A first shoulder 107 is formed between the head and pin portions 104 and 106.

Figure 7:
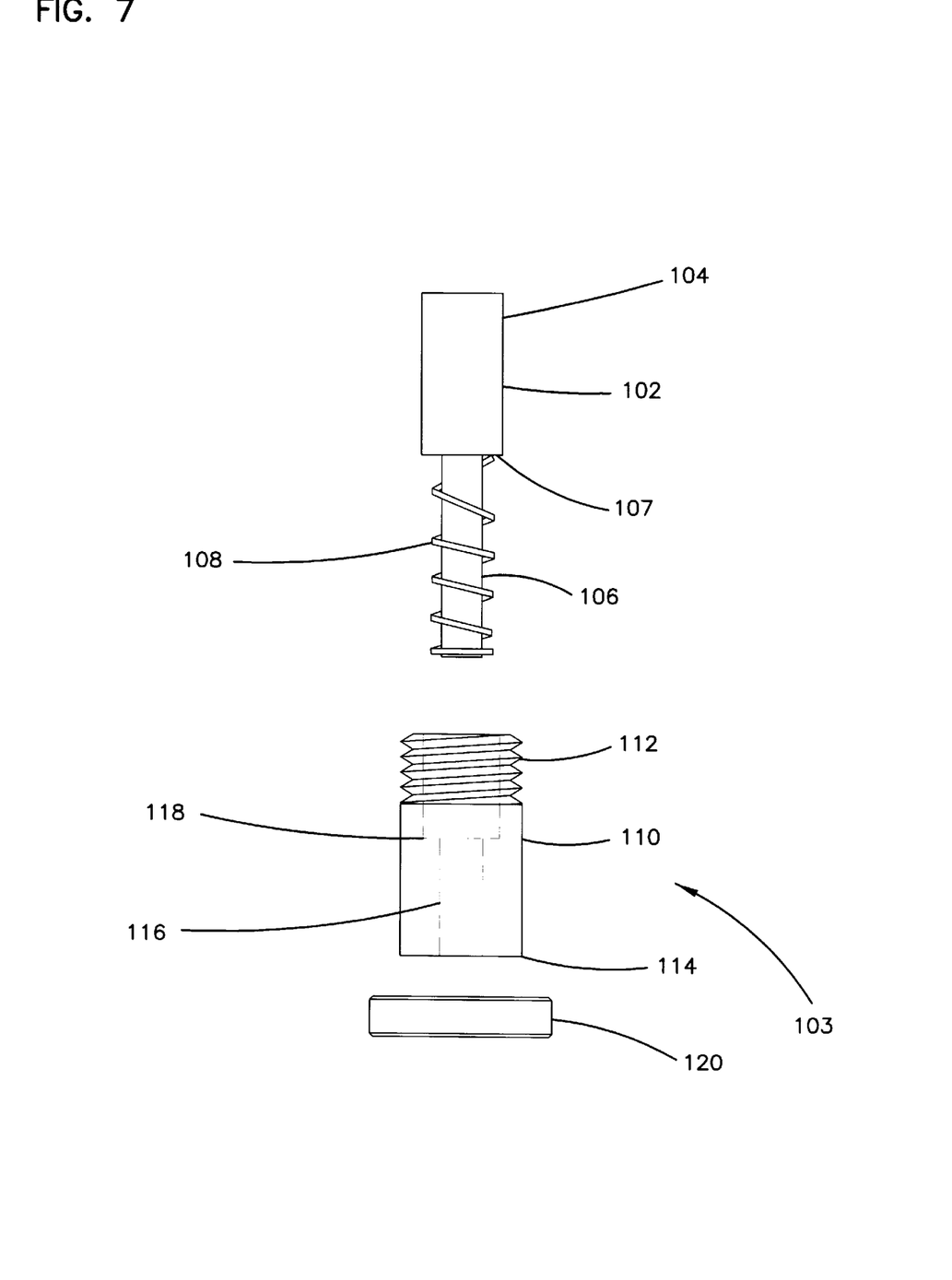
FIG. 7 is a cross-sectional view of a plunger assembly that is used as a locking mechanism in the trailer hitch of FIG. 1.

As shown in FIGS. 1 and 7, the plunger assembly 103 includes a plunger housing 110 having a threaded end 112 which is opposite a flat end 114. The plunger housing 110 defines a longitudinal opening 116 extending therethrough for receiving the plunger 102. The longitudinal opening 116 is enlarged adjacent the threaded end 112 for receiving the head portion 104 of the plunger 102 and is narrow adjacent to the flat end 114 of the plunger housing 110 to receive the pin portion 106 of the plunger 102. Along the longitudinal opening 116 between the threaded end 112 and the flat end 114, the plunger housing 110 includes a second shoulder 118 that extends circumferentially around the longitudinal opening 116.

When the plunger 102 is inserted in the plunger housing, the pin portion 106 of the plunger 102 has an end that extends completely through the plunger housing 110 and is rigidly connected to a knob 120. A plunger spring 108 is mounted on the pin portion 106 and is captured between the first and second shoulders 107 and 118.

The threaded end 112 of the plunger housing 110 is preferably threaded within a side opening 122 that is counterbored transversely into one of the left or right side walls 40 and 42 of the base 22. The side opening 122 communicates with the second opening 50 defined by the base 22. With the plunger housing 110 threaded into the side opening 122, the head portion 104 of the plunger 102 is biased by the plunger spring 108 against the surface of the shaft 26.

The head portion 104 of the plunger 102 is designed to fit within a plunger opening 124 defined by the shaft 26 to lock the pivotal locking arm 32 when the locking arm 32 is concurrently in the lower and closed positions. The plunger opening 124 extends transversely through the shaft 26 and is transposed approximately 90 degrees from the alignment of the pivotal locking arm 32 such that when the pivotal locking arm 32 is in the closed position (as shown in FIG. 4), the plunger side opening 124 and the opening 122 are vertically aligned. Additionally, the plunger opening 124 is located a predetermined distance below the top end 54 of the shaft 26 such that when the pivotal locking arm 32 is moved to the lower position (as shown in FIG. 3), the plunger side opening 124 and the opening 122 are at the same elevation.

Due to the relative orientations of the plunger opening 124 and the side opening 122, when the pivotal locking arm 32 is concurrently in both the lower and closed positions, the plunger opening 124 and the opening 122 are co-axially aligned. When the openings 122 and 124 are aligned, the plunger spring 108 causes the head portion 104 of the plunger 102 to automatically snap within the plunger opening 124 defined by the shaft 26 thereby automatically locking the pivotal locking arm 32 in place. In this manner, the shear strength provided by the cross-section of the head portion 104 of the plunger 102 prevents the shaft 26 from pivoting about it's longitudinal axis and also prevents the shaft 26 from telescopically moving within the sleeve 24.

The shaft 26 also preferably defines one or more dimples 126 which are offset 90 degrees from the plunger opening 124. When the pivotal locking arm 32 is pivoted to the open position and vertically moved to the lower position, one of the dimples 128 is co-axially aligned with the side opening 122 such that the head portion 104 of the plunger 102 preferably fits within the dimple 126 to hold the pivotal locking arm 32 in place.

The trailer hitch 20 also preferably includes a secondary locking pin 129 designed to be inserted through a hole 128 defined by the shaft 26 at a location adjacent to the bottom end 56 of the shaft. When the pivotal locking arm 32 is in the lower position, the hole 128 is located below the bottom side 46 of the base 22. By manually inserting the secondary locking pin 129 through the hole 128, contact between the secondary locking pin 129 and bottom side 46 of the base 22 prevents the shaft 26 from being moved upward. In this manner, the pivotal locking arm 32 is effectively locked in the lower position by the secondary locking pin 129.

It will be appreciated that the proximal end 38 of the base 22 is preferably adapted for connection to a vehicle. For example, a plate 130 may be welded to the proximal end 38 of the base 22 and to the sleeve 24. The plate preferably includes a plurality of connection apertures 132 for allowing the plate 130 to be bolted to a vehicle bumper or to be bolted to a hitch bar (not shown) that is configured to be received by a conventional trailer receiver.

It will also be appreciated that the base 22, sleeve 24 and plate 130 may be cast as a single piece unit. Similarly, the shaft 26, the pivotal locking arm 32, the handle 78, and the reinforcing member 34 may be cast as a single piece unit.

In use, the trailer hitch 20 can be coupled to trailers having lunette rings or trailers having various size ball couplers. To couple the vehicle to a trailer having a lunette ring, the pivotal locking arm 32 is pivoted to the open position as shown in FIG. 5. The spool 30 is then inserted over the mounting shank 28. Next, the lunette ring of the trailer is inserted over the spool 30 such that the lunette ring engages the curved lower portion of the outer surface 68 of the spool 30. The user then grasps the handle 78 of the pivotal locking arm 32 and pulls the pivotal locking arm 32 vertically upward to the upper position while concurrently pivoting the pivotal locking arm 32 approximately 90 degrees to the closed position as shown in FIG. 4. Once the pivotal locking arm 32 is in the closed position, the user releases the handle 78 such that the leaf spring 90 pulls the shaft 26 and pivotal locking arm 32 vertically downward to the lower position as shown in FIG. 3.

When the pivotal locking arm 32 reaches the lower position, the plunger 102 automatically snaps within the locking opening 124 defined by the shaft 26 such that the pivotal locking arm 32 is locked in place. With the pivotal locking arm 32 locked in place, the lunette ring of the trailer is captured by the pivotal locking arm 32 between the spool 30 and the sleeve 24. Additionally, the reinforcing member 34 is inserted within the top of the central opening 72 of the spool 30. The mounting shank 28 and the reinforcing member 34 together support the top and bottom of the spool 30. Towing loads applied to the spool 30 are concurrently transferred through both the locking arm 32 and the mounting shank 28. Such double engagement of the spool 30 increases the towing capacity of the hitch 20.

The final step in coupling the trailer hitch 20 to the lunette ring is to insert the secondary safety pin 129 through the hole 128 defined by the shaft 26. The safety pin 129 functions as an additional safety locking precaution.

To uncouple the lunette ring from the trailer hitch 20, the safety locking pin 129 is removed from the hole 128 defined by the shaft 26. Next, the knob 120 of the plunger 102 is pulled longitudinally outward from the plunger housing 110 such that the head portion 104 of the plunger 102 disengages from the plunger opening 124 of the shaft 126. Next, the user pulls the pivotal locking arm 32 vertically upward to the upper position (as shown in FIG. 2), and concurrently pivots the pivotal locking arm 32 approximately 90 degrees to the open position. With the pivotal locking arm 32 in the open position, the lunette ring can be removed from the spool 30.

To use the trailer hitch 20 in association with a ball coupler, a hitch ball 80 of the appropriate size is mounted on the mounting shank 28. To mount the hitch ball 80 on the mounting shank, the hitch ball 80 is inserted over the mounting shank 28 such that the mounting shank 28 is received within the central opening 82 of the hitch ball 80. The hitch ball 80 is then oriented such that the pin 84 is aligned with the second pin opening 88 defined by the mounting shank 28. Once the pin 84 is aligned with the second pin opening, the pin can be pushed through the second pin opening 88 such that the hitch ball 80 is securely retained on the mounting shank 28 (as shown in FIG. 6). When a ball coupler (not shown) is coupled over the hitch ball 80, the ball coupler engages an outer portion of the pin 84 to prevent the pin from sliding out of the second pin opening 88 of the mounting shank 28.

When one of the hitch balls 80 is mounted on the mounting shank 28, it is preferred for the pivotal locking arm 32 to be left in the open position as shown. When in the open position, the head portion 104 of the plunger 102 preferably engages one of the dimples 126 defined by the shaft 26 to prevent the swinging arm 32 from moving while the vehicle is in transit. It will be appreciated that the dimple 126 is sufficiently deep to allow the plunger 102 to hold the pivotal locking arm 32 in the open position, and is sufficiently shallow to allow the pivotal locking arm 32 to be manually pivoted from the open position toward the closed position without requiring the knob 120 of the plunger 102 to be pulled outward and without requiring excessive force to be applied to the pivotal locking arm 32.

Figure 8:
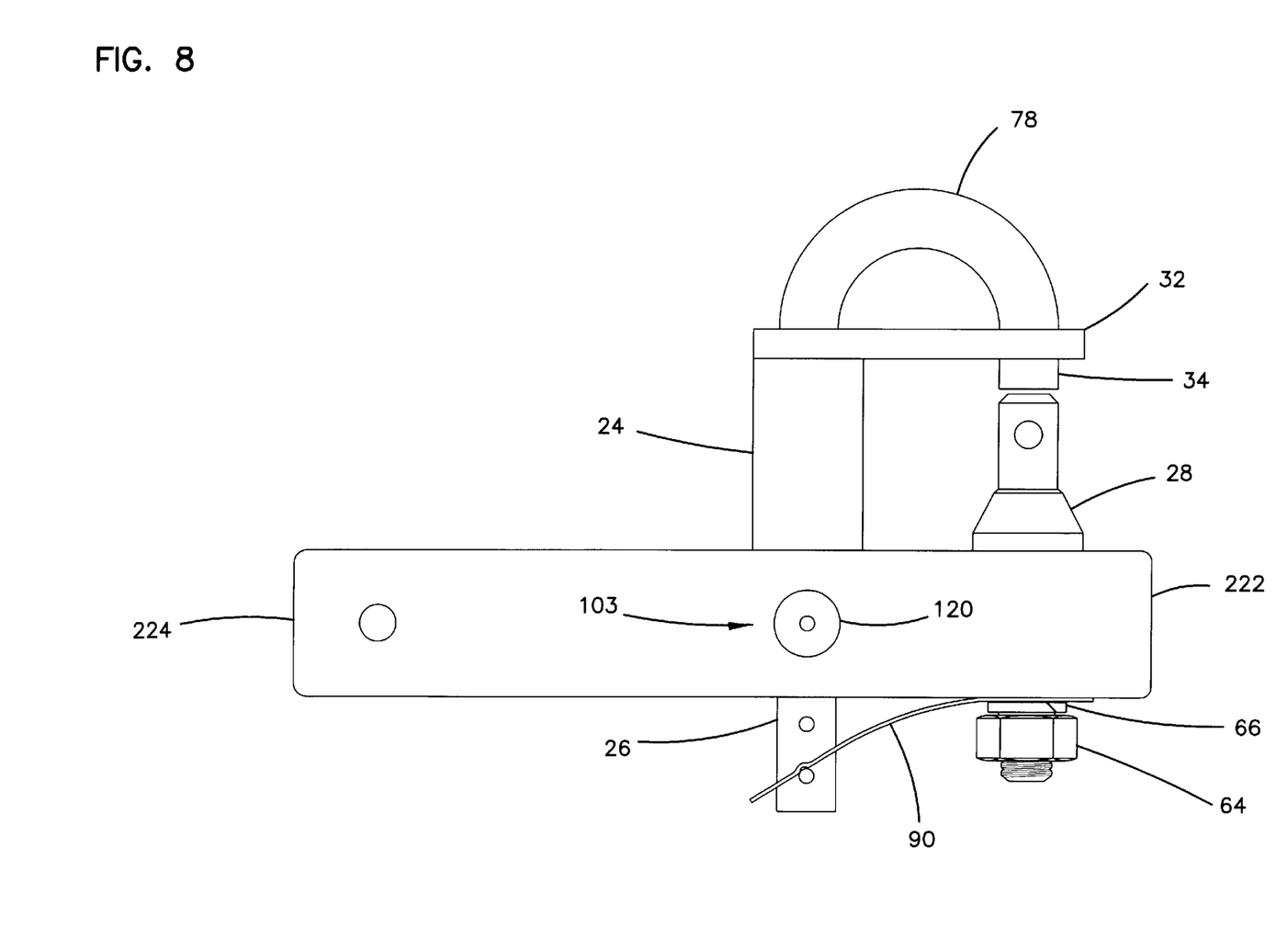
FIG. 8 is a cross-sectional view of an alternative trailer hitch constructed in accordance with the principles of the present invention.

FIG. 8 shows an alternative trailer hitch 220 constructed in accordance with the principles of the present invention. Similar to the trailer hitch 20, the trailer hitch 220 includes a sleeve 24, a shaft 26 mounted in the sleeve 24, a pivotal locking arm 32 extending transversely outward from the top of the shaft 26, a mounting shank 28 adapted for removably mounting a spool and a plurality of hitch balls, a locking structure such as a plunger assembly 103, and the majority of the other component parts that were previously described in the specification.

The difference between the trailer hitch 220 and the trailer hitch 20 is that the connection plate 130 and the base plate 22 of the trailer hitch 20, have been replaced with a receiver hitch bar 222 which functions as the base of the trailer hitch 220. The receiver bar 222 has a proximal end 224 designed to be inserted within a conventional trailer hitch receiver (not shown). It will be appreciated that the trailer hitch 220 functions in the same manner as the trailer hitch 20, and is designed to be used for lighter weight towing applications than the trailer hitch 20.

With regard to the foregoing description, it is to be understood that changes may be made in detail, especially in matters of the construction materials employed and the shape, size, and arrangement of the parts without departing from the scope of the present invention. It is intended that the specification and depicted embodiment be considered exemplary only, with a true scope and spirit of the invention being indicated by the broad meaning of the following claims.

What is claimed is as follows:

1. A trailer hitch comprising:
    a base adapted for connection to a vehicle;
    a mounting shank connected to the base;
    a spool removably mountable on the mounting shank, the spool including an outer surface for engaging a lunette ring of a trailer and an inner surface defining a central opening configured to mate with the mounting shank;
    at least one hitch ball that is removably mountable on the mounting shank; and
    a locking arm cooperating with the spool to couple the lunette ring to the trailer hitch, the locking arm being movable between a first position in which the locking arm is positioned away from the mounting shank and a second position in which the locking arm is aligned above the mounting shank, wherein when the spool is mounted on the mounting shank and the locking arm is moved from the first position to the second position, the locking arm forms a shear transferring engagement with the top of the spool such that loading forces applied to the spool are transferred through both the locking arm and the mounting shank.

2. The trailer hitch of claim 1, further comprising a locking structure for selectively retaining the locking arm in one of the first and second positions.

3. The trailer hitch of claim 1, wherein the outer surface of the spool is curved to define a recess extending around the perimeter of the spool for receiving the lunette ring.

4. The trailer hitch of claim 1, wherein the base comprises a hitch bar configured for insertion in a trailer hitch receiver.

5. The trailer hitch of claim 1, further comprising a plate defining a plurality of bolt openings, the plate being attached to the base to adapt the base for connection to the vehicle.

6. The trailer hitch of claim 1, further comprising a plate defining a plurality of bolt openings, the plate being attached to the proximal end of the base to adapt the base for connection to the vehicle.

7. The trailer hitch of claim 1, wherein the hitch ball includes a pin that is slidably connected to the hitch ball, and the mounting shank defines an opening extending transversely therethrough for receiving the pin when the hitch ball is mounted on the mounting shank.

8. A trailer hitch comprising:
   a base having a distal end opposite a proximal end, and a top side opposite a bottom side, the base being adapted for a vehicle;
   a sleeve extending generally perpendicularly outward from the top side of the base at a location adjacent to the proximal end of the base, the sleeve defining an opening extending longitudinally therethrough;
   a mounting shank extending outward from the top side of the base and being connected to the base at a location distally offset from the sleeve;
   a shaft having an upper portion, a lower portion, and a longitudinal axis, the shaft being telescopically mounted in the opening defined by the sleeve, the shaft also being rotatable within the sleeve about the longitudinal axis;
   a spool removably mountable on the mounting shank, the spool including an outer surface for engaging a lunette ring of a trailer, and an inner surface defining a central opening configured to mate with the shank;
   a pivotal locking arm connected to the upper portion of the shaft and extending generally radially outward from the shaft, the pivotal locking arm being generally vertically moveable between an upper position and a lower position, the pivotal locking arm also being pivotally moveable about the longitudinal axis of the shaft between a closed position in which the pivotal locking arm is aligned above the mounting shank, and an open position in which the pivotal locking arm is pivoted away from the mounting shank; and
   a reinforcing member extending downward from the pivotal locking arm at a location distally offset from the sleeve, wherein when the spool is mounted on the shank and the pivotal locking arm is pivoted from the open position to the closed position and then moved from the upper position to the lower position, the reinforcing member fits within the central opening of the spool such that the mounting shank and the reinforcing member provide double engagement of the spool.

9. The trailer hitch of claim 8, further comprising at least one hitch ball that is removably mountable on the mounting shank.

10. The trailer hitch of claim 8, further comprising a at spring member that cooperates with the shaft to bias the pivotal locking arm downward.

11. The trailer hitch of claim 8, further comprising a locking structure for restraining the pivotal and upward and downward movement of the locking arm.

12. The trailer hitch of claim 11, wherein the locking structure comprises at least one locking pin that engages the shaft to prevent the shaft from moving telescopically within the sleeve.

13. The trailer hitch of claim 11, wherein the locking structure comprises a spring loaded plunger that automatically locks the pivotal locking arm in place when the pivotal locking arm is manually pivoted to the closed position then moved from the upper position to the lower position.

14. The trailer hitch of claim 8, wherein the outer surface of the spool is curved to define a recess extending around a perimeter of the spool for receiving the lunette ring.

15. The hitch of claim 8, further including a handle connected to the pivotal locking arm.

16. The hitch of claim 15, wherein the handle, the reinforcing member and the shaft are unitarily formed.

17. The hitch of claim 8, further including a means for retaining the pivotal locking arm in the open position.

18. The trailer hitch of claim 8, wherein the base comprises a hitch bar configured for insertion in a trailer hitch receiver.

19. A trailer hitch kit comprising:
   a mounting assembly including a base having a distal end opposite a proximal end, and a top side opposite a bottom side, the base being adapted for connection to a vehicle; a sleeve extending generally perpendicularly outward from the top side of the base at a location adjacent to the proximal end of the base, the sleeve defining an opening extending longitudinally therethrough; a mounting shank extending outward from the top side of the base and being connected to the base at a location distally offset from the sleeve; a shaft having an upper portion, a lower portion, and a longitudinal axis, the shaft being mounted in the opening defined by the sleeve and being rotatable about the longitudinal axis; a pivotal locking arm connected to the upper portion of the shaft and extending generally radially outward from the shaft, the pivotal locking arm being moveable between a closed position in which the pivotal locking arm is aligned above the mounting shank, and an open position in which the pivotal locking arm is pivoted away from the mounting shank;
   a spool removably mountable on the mounting shank, the spool including an outer surface for engaging a lunette ring of a trailer, and an inner surface defining a central opening configured to mate with the shank; and
   at least one hitch ball removably mountable on the mounting shank.

20. A trailer hitch comprising:
   a base adapted for connection to a vehicle;
   a mounting shank connected to the base;
   a spool removably mountable on the mounting shank, the spool including an outer surface for engaging a lunette ring of a trailer and an inner surface defining a central opening configured to mate with the mounting shank, the outer surface of the spool being curved to define a recess extending around the perimeter of the spool for receiving the lunette ring; and
   a locking arm cooperating with the spool to couple the lunette ring to the trailer hitch, the locking arm being movable between a first position in which the locking arm is pivoted away from the mounting shank and a second position in which the locking arm is aligned above the mounting shank, wherein when the spool is mounted on the mounting shank and the locking arm is moved from the first position to the second position, the locking arm forms a shear transferring engagement with the top of the spool such that loading forces applied to the spool are transferred through both the locking arm and the mounting shank.

21. A trailer hitch comprising:
   a base adapted for connection to a vehicle;
   a mounting shank connected to the base;
   a spool removably mountable on the mounting shank, the spool including an outer surface for engaging a lunette ring of a trailer and an inner surface defining an opening configured to mate with the mounting shank;

at least one hitch ball that is removably mountable on the mounting shank; and a locking member adapted for preventing the lunette ring of the trailer from rising above the spool when the trailer is coupled to the trailer hitch.

22. The trailer hitch of claim 21, wherein the locking member comprises a locking arm.

23. The trailer hitch of claim 22, wherein the locking arm is pivotally connected to the base.

24. The trailer hitch of claim 21, wherein the locking member is movable from a locked position in which the locking member engages the spool, and an unlocked position in which the locking member is disengaged from the spool.

25. The trailer hitch of claim 21, wherein the locking member is pivotally movable relative to the base.

26. The trailer hitch of claim 21, wherein the locking member is movable between a first position in which at least a portion of the locking member is adapted to prevent the lunette ring from rising above the spool, and a second position in which the lunette ring can be uncoupled from the spool.

27. The trailer hitch of claim 21, wherein the locking member is positionable above the spool.

28. The trailer hitch of claim 21, wherein the outer surface of the spool is curved to define a recess extending around the perimeter of the spool for receiving the lunette ring.

29. The trailer hitch of claim 21, wherein the base comprises a hitch bar configured for insertion in a trailer hitch receiver.

30. The trailer hitch of claim 21, further comprising a plate defining a plurality of bolt openings, the plate being attached to the base to adapt the base for connection to the vehicle.

31. A trailer hitch comprising:

a base adapted for connection to a vehicle;

a mounting shank connected to the base;

a spool removably mountable on the mounting shank, the spool including an outer surface for engaging a lunette ring of a trailer and an inner surface defining an opening configured to mate with the mounting shank, the outer surface of the spool being curved to define a recess extending around the perimeter of the spool for receiving the lunette ring; and a locking member adapted for preventing the lunette ring of the trailer from rising above the spool when the trailer is coupled to the trailer hitch.

* * * * *